United States Patent

Stebley

[15] 3,651,716
[45] Mar. 28, 1972

[54] MANUFACTURE OF INSERT FOR DRILL BIT

[72] Inventor: Frank E. Stebley, 3815 Nemesis Avenue, Gurnee, Ill. 60031

[22] Filed: July 13, 1970

[21] Appl. No.: 61,042

Related U.S. Application Data

[62] Division of Ser. No. 822,883, May 8, 1969, Pat. No. 3,581,835.

[52] U.S. Cl. .........................................................76/108 A
[51] Int. Cl. ..............................................................B21k 5/02
[58] Field of Search ..............76/101 R, 101 A, 108 R, 108 A; 175/410, 374

[56] References Cited

UNITED STATES PATENTS

| | | | |
|---|---|---|---|
| 3,382,940 | 5/1968 | Stebley | 175/410 |
| 3,389,761 | 6/1968 | Ott | 175/410 X |

*Primary Examiner*—Bernard Stickney
*Attorney*—John S. O'Brien

[57] ABSTRACT

A solid wear-resistant sintered metallic carbide insert adapted for forcible insertion into an opening in a working face of a drill bit includes a generally polygonal body portion having at least about 12 sides extending between opposite ends thereof, and a head portion on one end of the body portion, the corners formed by the said sides being abraded at the ends of the body portion and tapering inwardly towards the end of the body portion opposite to the said one end thereof, the body portion being insertable into the working face opening for mounting the body portion therein with the head portion exposed at the working face. A drill bit incorporating the insert includes a body having a working face provided with a plurality of generally circular insert openings extending inwardly therefrom, and a plurality of the inserts mounted in the openings, each insert engaging the wall of the opening in which mounted in an interference fit.

A method of making the insert includes the steps of molding metallic carbide powder under die pressure to form a molded article including a generally polygonal body portion having at least about 12 sides extending between opposite ends thereof and a head portion on one end of the body portion, the body portion tapering inwardly towards the end thereof opposite to the said one end, sintering the molded article to form a sintered article having concave sides, and abrading the sintered article whereby the corners formed by the sides are abraded at the ends of the body portion and are tapered inwardly towards said opposite end of the body portion, thereby producing an insert having the body portion insertable into the working face opening for mounting the body portion therein with the head portion exposed at the working face.

9 Claims, 9 Drawing Figures

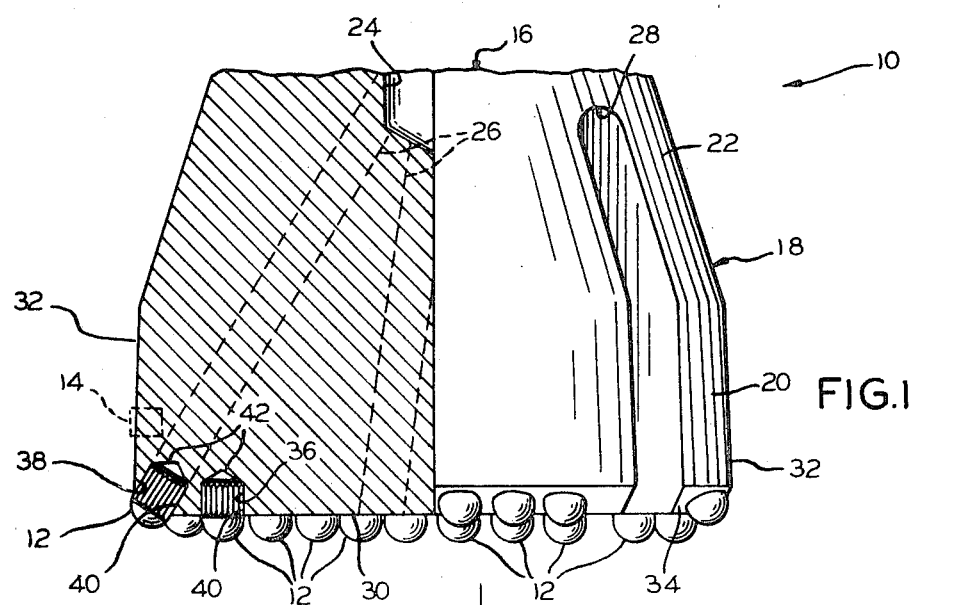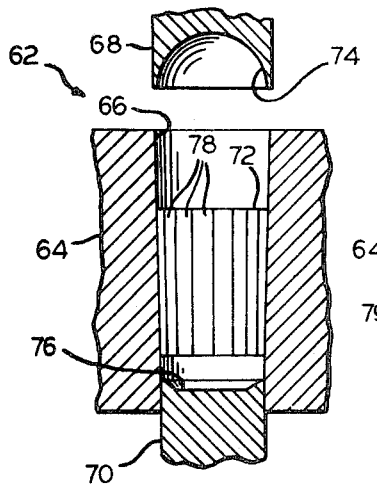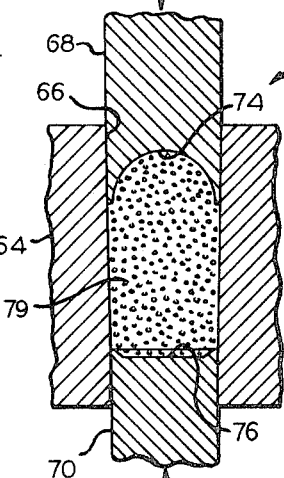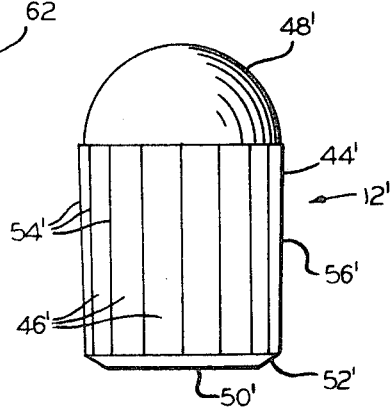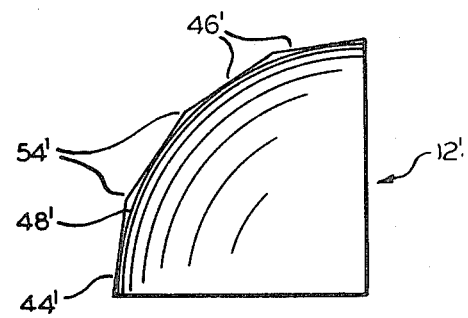

PATENTED MAR 28 1972 3,651,716

INVENTOR
FRANK E. STEBLEY
BY *John S. O'Brien*
ATTORNEY

MANUFACTURE OF INSERT FOR DRILL BIT

RELATED APPLICATION

This is a division of application Ser. No. 822,883, filed May 8, 1969 now U.S. Pat. No. 3,581,835, issued June 1, 1971.

BACKGROUND OF THE INVENTION

This invention relates to the manufacture of a solid wear-resistant sintered metallic carbide insert adapted for forcible insertion into an opening in a working face of a drill bit. More particularly, the invention relates to a simplified method of making an insert which may be mounted in imperfectly shaped openings in a drill bit with reduced insert fracture and loss in drilling.

Inserts or teeth of wear-resistant sintered metallic carbide are widely used in drill bits for earth drilling tools, especially for drilling into rock formations. Such inserts have much greater wearability than similar inserts constructed of steel. While hard and wear-resistant, the carbide inserts are also brittle and have poor resistance to bending. Consequently, the inserts have a tendency to break in use when not properly mounted in the drill bit, and they may also be lost from the bit. Inasmuch as the inserts cannot be replaced in many drill bits, it becomes necessary eventually to discard the entire bit, which is very costly.

A popular type of percussion drill bit is constructed of a solid steel body having a working face or faces at one end of the bit, and a plurality of generally cylindrical inserts or teeth of sintered metallic carbide which are mounted in openings in the working face and are exposed thereat. The inserts are similarly employed in roller cone and other types of drill bits for penetrating earth formations by impact and cutting action, and also for minimizing drill bit wear. The inserts are forcibly inserted into openings having slightly smaller diameters than the insert diameter, so that the inserts engage the walls of the openings in which mounted in an interference fit.

Owing to the brittle nature of the carbide inserts, they should be provided with maximum support by the steel bit body when mounted. With poor support, especially adjacent the face of the bit, the inserts are prone to fracture under transverse forces, and they may also work loose and fall out of the bit. In manufacturing a suitable bit body, the steel structure usually is drilled to provide insert openings and then heat-treated to a predetermined degree of hardness. The drilled holes then are precisely reamed to correct for heat distortion and drilling errors, and form insert openings or holes having the desired diameter and cylindrical configuration.

The carbide inserts are manufactured by molding metallic carbide powder under die pressure to form oversize molded articles. The molded articles are sintered to form solid sintered articles having the desired physical properties. Inasmuch as the molded articles are compressed between dies acting at opposite ends of the articles, the density or compression of the material varies from a maximum adjacent the ends to a minimum in the central region. The sintering step is accompanied by shrinkage, which increases towards the less dense central region, so that the resulting articles have generally concave sides. For example, the shrinkage in an insert of about five-eighth inch diameter and about 1 inch length is generally about 0.003 to 0.004 inch at the center. Consequently, the inserts are ground to eliminate the concavity and provide cylindrical bodies of the desired diameter. Thereafter, the inserts may be tumbled in an abrasive medium to abrade or round off their corners.

The finished inserts are pressed into the openings in the drill bit to seat them firmly in the openings, with the outer ends or head portions of the inserts exposed at the working face, from which they project for impacting and cutting action. Inserts provided for minimizing the wear of the bit may lie flush with the face of the bit or project lesser distances therefrom.

Careful insertion of the inserts into their openings is necessary, to avoid distortion of the openings which would reduce the gripping force. Inasmuch as the resiliency of the steel bit body is limited, a portion of the gripping force may be lost during mounting of the inserts. Drilling errors that survive the reaming operation most frequently result in the insert openings having greater diameters at the top than at the bottom. Openings may be non-circular at the top, or suffer from a bell-mouth condition. Consequently, the inserts are gripped most securely at the bottom and to lesser degrees in the center and upper or outer areas. The inserts then are more prone to fracture in their openings, and to loosening with eventual loss.

It would be highly advantageous to provide a wear-resistant sintered metallic carbide insert that may be securely mounted in an opening in a face of a drill bit despite imperfections in the size and shape of the opening as commonly encountered in practice. It would also be advantageous to provide a relatively simple method of making such an insert.

SUMMARY OF THE INVENTION

The invention claimed in my above-identied patent provides a new and improved solid wear-resistant sintered metallic carbide insert adapted for forcible insertion into an opening in a working face of a drill bit to obviate or minimize the problems previously occasioned by imperfections in the openings and provide a drill bit having inserts securely mounted therein and resistant to fracture and loss of inserts. The presently claimed invention provides a simplified method of making such an insert that takes advantage of the shrinkage which normally occurs in sintering molded carbide articles and eliminates the need for precision grinding of inserts.

The new insert of the invention claimed in the above-identified patent includes a generally polygonal body portion having at least about twelve sides extending between opposite ends thereof, and a head portion on one end of the body portion, the corners formed by the sides being abraded at the ends of the body portion and tapering inwardly towards the end of the body portion opposite to the head end, the body portion being insertable into a working face opening for mounting the body portion therein with the head portion exposed at the working face. The preferred metallic carbide comprises tungsten carbide. The body portion preferably is provided with about twelve to twenty sides in the insert sizes most commonly employed.

The new insert preferably also includes a seat portion having a beveled peripheral edge on the end of the body portion opposite to the head end, the corners formed by the edge being abraded, and the seat portion being seated on the bit at the base of the working face opening when the body portion is mounted therein.

The invention of the above-identified patent also provides a drill bit including a body having a working face provided with a plurality of generally circular insert openings extending inwardly therefrom, and a plurality of the inserts mounted in the openings, each insert engaging the wall of the opening in which mounted in an interference fit.

The new method of the present invention includes the steps of molding metallic carbide powder under die pressure to form a molded article including a generally polygonal body portion having at least about twelve sides extending between opposite ends thereof and a head portion on one end of the body portion, the body portion tapering inwardly towards the end opposite to the one end, sintering the molded article to form a sintered article having concave sides, and abrading the sintered article whereby the corners formed by the sides are abraded at the ends of the body portion and are tapered inwardly towards the end thereof opposite the head end, thereby producing an insert having the body portion insertable into a working face opening for mounting the body portion therein with the head portion exposed at the working face. In a preferred embodiment of the invention, the sintered article is abraded by tumbling in an abrasive medium.

The new insert is constructed for overcoming the errors which commonly occur in drilling insert openings in a drill bit face, without need for the usual reaming operation to provide a precise hole size and shape. When mounted in the drill bit, the insert is supported securely from top to bottom, thereby resisting bending and torsional stresses, and fracture and loss of inserts are prevented.

The new insert is made by a method which embodies generally conventional molding and sintering steps followed merely by an abrading step that dispenses with prior precision grinding.

BRIEF DESCRIPTION OF THE DRAWINGS

The attached drawings illustrate preferred embodiments of the invention, without limitation thereto. In the drawings, like elements are identified by like reference symbols in each of the views, and:

FIG. 1 is a partly sectional fragmentary view of a rotary-percussion drill bit incorporating inserts constructed according to the invention claimed in aforesaid U.S. Pat. No. 3,581,835 and made according to the method of the present invention;

FIG. 2 is an enlarged fragmentary sectional view of a die assembly employed in making molded articles for sintering according to the new method of the present invention;

FIG. 3 is a view similar to FIG. 2 but illustrating the molding operation;

FIG. 4 is a further enlarged view of a molded article made as illustrated in FIG. 3;

FIG. 5 is a top plan view on a still larger scale of one quadrant of the article of FIG. 4, representative also of the remainder of the article;

DESCRIPTION OF THE PREFERRED EMBODIMENTS

Figure 6:
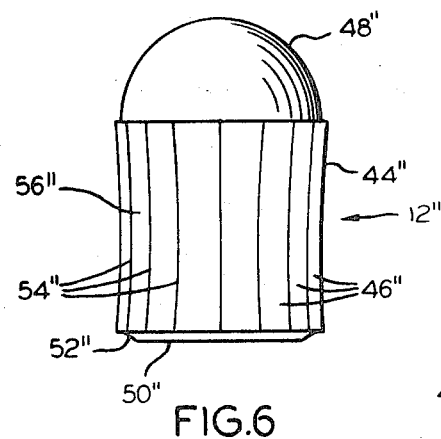
FIG. 6 is an elevational view of the article illustrated in FIG. 4 after sintering the article, drawn to the same scale and with the side curvature thereof exaggerated for illustrative purposes.

Referring to the drawings, FIG. 1 illustrates a rotary-percussion drill bit 10 incorporating a plurality of solid wear-resistant sintered metallic carbide inserts 12 as claimed in the above-identified patent and made according to the presently claimed invention. The inserts 12 are illustrated in greater detail in FIG. 7. An optional insert 14 is also illustrated in FIG. 1, in broken lines.

The illustrative drill bit 10 includes a conventional bit body 16, of which only the impact end 18 is illustrated. In the complete structure, a shank is integral with the impact end and serves for connection to a drilling tool including passage means for supplying water or other fluid to the bit body 16. The impact end 18 includes a slightly tapered frusto-conical outer base portion 20, and an inner frusto-conical connecting portion 22 joining the base portion to the shank of the bit body. The bit body is provided with a central longitudinal fluid passageway 24 communicating with branch passageways 26 which discharge flushing fluid from the base portion 20. Longitudinal grooves 28 in the surface of the bit body 16 provide return passageways for fluid and cuttings removed from the bottom of a hole being drilled in a formation.

Working faces or surfaces are provided by the base portion 20 of the bit body 16, including a transverse end face 30 on the bottom of the bit, a side face 32 extending upwardly and slightly inwardly from the end face, and a corner face 34 at an angle to the end face 30 around the periphery of the base portion. The end face 30 and the corner face 34 are provided with generally cylindrical insert openings or holes 36 and 38, respectively, which extend inwardly from the faces. The holes are defined by generally circular walls 40 and shallow conical bottom surfaces 42 as formed by the drill bit. The bottom surfaces 42 extend at angles of about 60° to the longitudinal axes of the openings 36 and 38. The inserts 12 are mounted in the openings 36 and 38, each insert engaging a wall 40 in an interference fit and being seated on a bottom surface 42 at the base of an opening.

In the illustrative bit 10, fragmentation of a formation is effected principally at the end face 30 and the corner face 34. The insert 14 and other similar inserts are optionally provided in the side face 32 to maintain the gauge of the bit. Alternatively, inserts providing additional cutting action may be mounted in the side face 32 or other corresponding structure. Representative such structure is illustrated in my U.S. Pat. No. 3,382,940, wherein the impact end of the bit includes a separable head. Likewise, the present invention may be applied to a drill bit otherwise constructed like the drill bit of such patent, to drill bits of the rolling cutter type, and to other drill bits for drilling or boring into hard earth formations.

The bit body 16 is a solid steel body having the described passageways, grooves and openings. The bit body is constructed so that its hardness varies, being softer adjacent the working faces 30, 32 and 34 where the inserts are mounted, and being harder behind the inserts. There is a hardness transition zone between the two regions of the body. The inserts 12, and other illustrative inserts, preferably are formed of tungsten carbide, also referred to as cemented tungsten carbide. While such carbide is preferred, other carbide compositions might be employed where desirable, such as tantalum carbide, which however produces a more brittle insert.

Figure 7:
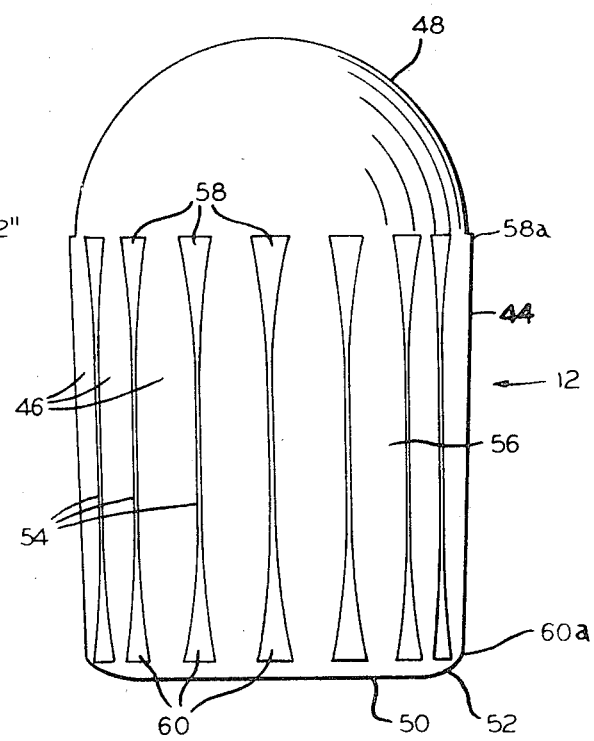
FIG. 7 is an enlarged elevational view of the sintered article after it has been abraded, thus providing an insert constructed according to a preferred embodiment of the invention.

Referring to FIG. 7, the insert 12 includes a generally polygonal body portion 44 having a plurality of sides 46 of uniform width extending between opposite ends thereof. A hemispherical head portion 48 is integral with the body portion 44 on one end of the latter. A circular seat portion 50 having a beveled peripheral edge 52 is integral with the body portion 44 on the opposite end thereof. The circular base of the hemispherical head portion 48 is substantially tangent to the sides 46, as illustrated in FIG. 5 for the pre-sintered molded article 12', showing the head portion 48' tangent to the sides 46' thereof. Likewise, the circular base of the seat portion 50 is substantially tangent to the sides 46.

The corners 54 formed by the body portion sides 46 are abraded or rounded increasingly from about the central region 56 of the body portion to the opposite ends thereof, where relatively long radius abraded or rounded corner surfaces 58 and 60 are provided. The peripheral edge 52 of the seat portion 50 forms corners with the sides 46 and the bottom of the seat portion, and such corners also are abraded or rounded.

In the illustrative structure, the abraded corner surfaces 58 and 60 may project slightly beyond adjacent surfaces of the head portion 48 and the seat portion 50, as illustrated by the abraded surfaces 58a and 60a shown in profile. The degree of projection may vary, and the abraded surfaces 58 and 60 may be substantially flush with such adjacent surfaces. The corners 54 taper inwardly at a small angle to the longitudinal axis of the insert, towards the end of the body portion 44 bearing the seat portion 50. The areas of the sides 46 between the corners 54 are slightly concave.

Referring to FIGS. 2 and 3, manufacture of the insert 12 according to the invention is initiated in a generally conventional mold assembly 62. The assembly includes a mold body 64 having a mold cavity 66 therein, and upper and lower dies 68 and 70. Pursuant to the invention, the walls of the mold cavity 66 are provided with a polygonal wall section 72 having a slight inward taper from top to bottom. The upper die 68 is provided with a hemispherical cavity 74. The lower die 70 is provided with a shallow frusto-conical cavity 76. The cavities 74 and 76 have circular openings at their inner ends which are substantially tangent to the sides 78 of the polygonal wall section 72.

FIG. 2 illustrates the dies 68 and 70 in withdrawn position preparatory to filling and closing the mold assembly 62. FIG. 3 illustrates the mold assembly 62 as it appears when filled with metallic carbide powder 79 under the pressure of the dies 68 and 70. It will be noted that the die pressure is exerted at the opposite ends of the article being formed, which results in greater compression and density adjacent the ends and lesser compression and density in the direction of the longitudinal center of the molded article. The taper provided by the polygonal wall section 72 serves both for ejection of the molded article at the top of the mold cavity 66, and for producing an article and ultimately the insert 12 having a functionally desirable taper, as described hereinafter.

The product of the molding operation illustrated in FIGS. 2 and 3 is the molded article 12' illustrated in FIGS. 4 and 5. This article includes a generally polygonal body portion 44' having sides 46' extending between opposite ends thereof and forming corners 54', a hemispherical head portion 48' on one end of the body portion, and a frusto-conical seat portion 50' having a beveled or chamfered peripheral edge 52' on the opposite end of the body portion. The edge 52' extends at an angle of 60° to the longitudinal axis of the molded article. The bases or inner portions of the head portion 48' and the seat portion 50' are circular and substantially tangent to the sides 46' within the polygon defined by the body portion 44'. The body portion tapers inwardly towards the end bearing the seat portion 50'.

The molded article 12' is sintered in a conventional manner to produce a solid wear-resistant sintered metallic carbide article 12", illustrated in FIG. 6, which may be abraded to produce the desired insert 12, illustrated in FIG. 7. The sintering operation is accompanied by a degree of shrinkage. Owing to the decrease in density in the molded article 12', from the ends of the body portion 44' to the central region 56' thereof, the sides 46" of the sintered article 12" are slightly concave, as illustrated.

In the past, when conventional inserts were made generally in the foregoing manner, the sintered articles were ground in a close tolerance operation to eliminate the concavity and accurately determine the diameter of the insert. Thereafter, they were tumbled in an abrasive medium for a limited time sufficient to remove any scale, impart a finer, smoother surface to the insert, and remove the sharp corners on the insert.

In the present invention, the sintered article 12", without grinding, is abraded for an extended period of time, e.g., about 8 to 10 hours of tumbling in an abrasive medium, sufficient to abrade the corners 54", especially at the ends of the body portion 44". The most prominent surfaces are abraded to the greatest extent. Consequently, the ends of the corners 54" adjacent the head portion 48" and the seat portion 50", are abraded or radiused to a substantial extent, whereas the intermediate segments of the corners 54" are abraded to a lesser degree towards the central region 56". Thus, the corners 54" are abraded or rounded increasingly from about the central region 56" of the body portion to the ends thereof. In this manner, the abraded corner surfaces 58 and 60 and progressively smaller abraded corner surfaces are provided on the body portion 44, as illustrated in FIG. 7.

Abrasion of the corners 54" of the sintered article 12" in this manner results in the corners 54 of the insert 12 being tapered inwardly towards the seat portion 50, similarly to the taper of the body portion 44' of the molded article 12'. The portions of the sides 46 of the insert 12 between the ends of the body portion 44 will retain the concavity of the sintered article sides 46", inasmuch as they are abraded to a substantial extent only adjacent the ends of the body portion. The extent to which the abraded corner surfaces 58 and 60 project from the head and seat portions 48 and 50 will depend upon the time and conditions of abrasion, which are sufficient to provide the desired taper in the corners 54. The degree of projection will also depend upon the number of sides 46, diminishing with an increasing number of sides. At times, the abraded surfaces 58 and 60 may be substantially flush at their ends with the head and seat portions 48 and 50.

The corners formed by the seat portion 50" of the sintered article also are abraded, so that the beveled peripheral edge 52 on the insert 12 becomes rounded, as illustrated in FIG. 7. At the same time, the adjacent edges of the side corner surfaces 60 may be abraded to merge with the edge 52.

The abrading operation preferably is conducted by barrel-tumbling in an abrasive medium, in a conventional manner. The operation is sometimes referred to as "pre-honing" when applied to cutting inserts for shop tools. An effective medium includes aluminum oxide and silicon rock wetted with a basar-water solution. Alternatively, the inserts may first be grit-blasted while set on end in a rubber mat or other holder, exposing their opposite ends alternately, to hasten the abrasion. Such abrasion is followed by tumbling in an abrasive medium to provide the desired smooth finish.

Figure 8:
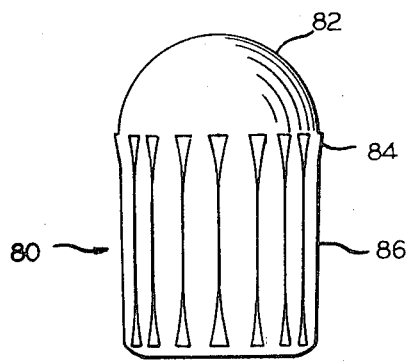
FIG. 8 is an elevational view of an insert representing another embodiment made according to the present invention, drawn to the scale of FIG. 6, wherein the head portion of the insert is enlarged relative to the insert of FIG. 7.

FIG. 8 illustrates another embodiment 80 of the insert made according to the invention. This structure is provided with an enlarged hemispherical head portion 82. The adjacent end 84 of the insert body portion 86 is tapered or inclined at a greater angle to the longitudinal axis of the insert, corresponding to the enlarged diameter of the head portion. This structure is advantageous for mounting in drill bit openings which suffer from a bell-mouth condition around the rims of the openings at the working face. With suitable modification of the mold assembly 62 shown in FIGS. 2 and 3, the insert 80 is made in the same manner as the foregoing insert 12.

Figure 9:
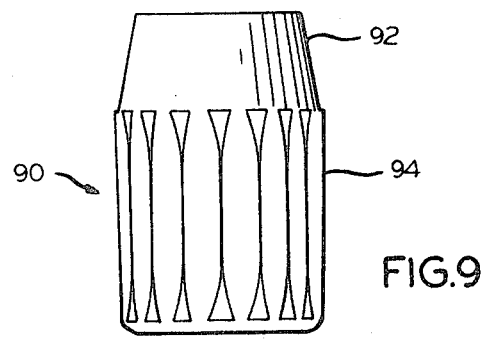
FIG. 9 is an elevational view on the same scale of an insert according to a further embodiment made according to the present invention, wherein the insert is provided with a head portion having a different configuration.

FIG. 9 illustrates an insert 90 having a head portion 92 of frusto-conical configuration on a body portion 94 like the body portion 44 of the above-described insert 12. The insert 90 might be preferred, for example, for use as the optional insert 14 illustrated in the side face 32 of the drill bit 10 in FIG. 1. Similarly, various other head portion configurations might be substituted where desirable. Except for appropriate changes in the die cavity for molding, the manufacture of the insert 90 or inserts having other head portions is as described above for the insert 12.

Referring to the insert 12 shown in FIGS. 1 and 7 as illustrative, the body portion 44 of the insert is insertable into the openings 36 and 38 in the working faces 30 and 34 for mounting the body portion therein with the beveled edge 52 of the seat portion 50 seated on the correspondingly angled bottom surface 42 of each opening and the head portion 48 exposed at the working face and, in these instances, projecting outwardly therefrom. In pressing the insert into an opening, the tapered construction and the rounded seat portion 50 assist in properly locating the insert in the opening without disturbing the opening or scraping the side wall 40. As the tapered body portion 44 is inserted, the corners 54 wedge into the side wall 40 and correct for drilling errors. The steel of the bit body may conform to the configuration of the polygon. Engagement of the corners 54 serves to prevent turning of the insert when subjected to torsional forces, and prevent axial movement of the insert. The tapered construction serves to wedge the insert in the opening not only towards the bottom of the wall 40, where drilling errors may be slight, but also at the middle and upper or outer areas of the wall 40, where the opening is more likely to suffer from imperfections such as widening, out-of-round, and loss of resiliency.

As the body portion 44 is inserted, the wedging pressure of the corners 54 is increased from the central region 56 to the widening abraded corner surfaces 58 at the outer end of the body portion. The rounded abraded corner surfaces 60 on the inner end of the body portion assist in preventing scraping of the wall 40 of the opening. In this manner, the inserts may be mounted in imperfect holes and are firmly secured therein from top to bottom. The inserts are prevented from bending or turning as they are exposed to lateral and torsional forces, thus minimizing fracture, loosening, and loss of inserts.

Drill bit inserts most frequently fall in the range of about ⅜ to ⅝ inch in diameter, with ½ inch and ⅝ inch sizes being most frequently used. The inserts of such sizes preferably have at least about 12 sides in the polygonal body portion, up to about 20 sides. Preferably, 16 to 18 sides are provided in the ½ inch to ⅝ inch diameter inserts.

The polygonal body portion, such as the portion 44 of the insert 12, preferably is tapered about one-sixteenth inch per foot of length for short inserts, e.g., having body portions 44 about three-eighth inch in length, while a lesser tapering of about one thirty-secondth inch per foot may be employed for longer lengths, e.g., a length of about three-fourth inch for the body portion 44.

The openings 36, 38 and the like in the working faces of the drill bit body 16 or other structure may be about 0.003 to 0.010 inch undersize with respect to the diameter of the insert 44 measured at the outer end of the body portion 44, adjacent to the head portion 48. Relatively wide variation in the size of the opening is permissible, and the opening need not be true, so that the prior reaming of the opening following heat treatment may be dispensed with.

The invention claimed in U.S. Pat. No. 3,581,835 thus provides a new and improved insert overcoming prior problems and providing advantages in mounting the insert in a drill bit so as to minimize fracture and loss, and a more serviceable drill bit incorporating the insert. The present invention provides a simplified method of making the insert, which eliminates the need for precision grinding and utilizes the normal sintering shrinkage formerly considered to be a disadvantage. While preferred embodiments of the invention have been illustrated and described, it will be apparent that various changes and modifications may be made therein within the spirit and scope of the invention. It is intended that such changes and modifications be included within the scope of the appended claims.

I claim:

1. A method of making a solid wear-resistant sintered metallic carbide insert adapted for forcible insertion into an opening in a working face of a drill bit which comprises molding metallic carbide powder under die pressure to form a molded article including a generally polygonal body portion having at least about twelve sides extending between opposite ends thereof and a head portion on one end of the body portion, said body portion tapering inwardly towards the end thereof opposite to said one end, sintering said molded article to form a sintered article having concave sides, and abrading said sintered article whereby the corners formed by said sides are abraded at said ends of said body portion and are tapered inwardly towards said opposite end of said body portion, thereby providing an insert having said body portion insertable into said working face opening for mounting the body portion therein with said head portion exposed at said working face.

2. A method as defined in claim 1 wherein said metallic carbide comprises tungsten carbide.

3. A method as defined in claim 1 wherein said body portion has about 12 to 20 sides.

4. A method as defined in claim 1 wherein said head portion has a circular base substantially tangent to said sides.

5. A method as defined in claim 1 wherein said molded article includes a seat portion having a beveled peripheral edge on said opposite end of said body portion, the corners formed by said edge being abraded in said abrading step, and said seat portion being seated on said bit at the base of said working face opening when said body portion is mounted therein.

6. A method as defined in claim 1 wherein said sintered article is abraded by tumbling in an abrasive medium.

7. A method of making a solid wear-resistant sintered tungsten carbide insert adapted for forcible insertion into an opening in a working face of a drill bit which comprises molding tungsten carbide powder under die pressure to form a molded article including a generally polygonal body portion having about twelve to twenty sides extending between opposite ends thereof, a head portion on one end of the body portion, and a seat portion having a beveled peripheral edge on the opposite end of said body portion, said body portion tapering inwardly towards said opposite end thereof, sintering said molded article to form a sintered article having concave sides, and abrading said sintered article whereby the corners formed by said sides are abraded increasingly from about the central region of said body portion to said ends thereof and are tapered inwardly towards said opposite end of the body portion, and the corners formed by said seat portion edge are abraded, thereby providing an insert having said body portion insertable into said working face opening for mounting the body portion therein with said seat portion seated on said bit at the base of said working face opening and said head portion exposed at said working face.

8. A method as defined in claim 7 wherein said head portion is substantially hemispherical with its base substantially tangent to said sides.

9. A method as defined in claim 7 wherein said sintered article is abraded by tumbling in an abrasive medium.

* * * * *